(12) United States Patent
Couillard et al.

(10) Patent No.: US 6,454,890 B1
(45) Date of Patent: Sep. 24, 2002

(54) METHOD AND APPARATUS FOR UP TO FULL WIDTH ULTRASONIC BONDING

(75) Inventors: Jack Lee Couillard, Menasha; Robin Kurt Nason, Oshkosh; Kent William Abel, Black Creek, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 9 days.

(21) Appl. No.: 09/727,218

(22) Filed: Nov. 30, 2000

(51) Int. Cl.[7] .............................................. B29C 65/08
(52) U.S. Cl. ................... 156/73.1; 156/290; 156/308.4; 156/553; 156/555; 156/580.2; 156/582
(58) Field of Search ............................... 156/73.1, 290, 156/308.2, 308.4, 324, 553, 555, 580.1, 580.2, 582

(56) References Cited

U.S. PATENT DOCUMENTS

| | | | |
|---|---|---|---|
| 4,083,737 A | | 4/1978 | Foote, Jr. et al. .......... 156/73.1 |
| 4,534,819 A | * | 8/1985 | Payet et al. .................. 156/515 |
| 4,713,132 A | * | 12/1987 | Abel et al. .................. 156/73.1 |
| 5,421,924 A | * | 6/1995 | Ziegelhoffer et al. ....... 156/73.1 |
| 5,707,470 A | | 1/1998 | Rajala et al. ............... 156/73.2 |
| 5,711,847 A | | 1/1998 | Rajala et al. ............. 156/580.2 |
| 5,817,199 A | | 10/1998 | Brennecke et al. ......... 156/73.1 |
| 6,004,427 A | * | 12/1999 | Kohn ....................... 156/580.2 |
| 6,123,792 A | | 9/2000 | Samida et al. ............. 156/73.1 |

\* cited by examiner

*Primary Examiner*—James Sells
(74) *Attorney, Agent, or Firm*—Wilhelm Law Service; Thomas D. Wilhelm (57) ABSTRACT

Bonding apparatus and methods for creating up to full-width ultrasonic bonds in an advancing web. The bonding apparatus comprises a first nip, defined by, in combination, a first set of bonding elements comprising a first rotary ultrasonic horn and a first rotary anvil, and first engagement apparatus bringing the first horn and first anvil into effective bonding engagement with each other. The first horn and anvil being supported from support structure and rotating in common with each other thereby to convey the web through the first nip. The bonding apparatus also comprises a second nip, defined by a second set of bonding elements comprising second separate and distinct horn and anvil, and second engagement apparatus bringing the second horn and second anvil into effective bonding engagement with each other. The first and second sets of bonding elements are cooperatively disposed at first and second separate and distinct work stations spaced along the length of the operations path, and are preferably disposed at respective first and second different locations across the width of the operations path.

40 Claims, 5 Drawing Sheets

METHOD AND APPARATUS FOR UP TO FULL WIDTH ULTRASONIC BONDING

BACKGROUND OF THE INVENTION

The present invention relates to apparatus and methods for effecting up to full-width ultrasonic bonding on at least one continuously moving web, or work piece attached to a continuously moving web, using ultrasonic bonding apparatus. The invention more particularly concerns apparatus and methods for effecting up to full-width ultrasonic bonding on at least one continuously moving web using rotary ultrasonic bonding.

It is known to bond at least one continuously moving substrate web along up to its full width by constrictively passing the web between multiple rotating ultrasonic horns and a common, multiple repeat, full-width rotating anvil roll. Typically, the anvil roll includes one or more arrays of raised projections configured to bond the web in a predetermined bond pattern. The rotary ultrasonic horns are capable of expressing ultrasonic energy at a bonding surface to ultrasonically bond the web as the web constrictively travels between the rotary ultrasonic horns and the common anvil roll. Representative examples of rotary ultrasonic horns which have been used to bond at least one web are described in U.S. Pat. No. 5,096,532 to Neuwirth et al issued Mar. 17, 1992; and U.S. Pat. No. 5,110,403 to Ehlert issued May 5, 1992.

The consistency and quality of the bond when using such rotary bonding techniques is dependent on the consistency of the force exerted on the web by the combination of the anvil roll and the bonding roll; the time during which the web is being pressed in the constrictive nip which is dependent on, among other things, the operating speed; and the types of materials being bonded. The consistency and quality of the bonds are also dependent on the frequency and amplitude of the vibrations of the ultrasonic horn.

In the above conventional technology, to achieve full-width bonding, the web or webs being acted on are wrapped in surface-to-surface relationship with the rotary anvil over a substantial portion of the circumference of the rotary anvil. Multiple rotary ultrasonic horns used in combination with a common anvil can be acceptable for bonding thin webs along the full width, but webs with thin and thick sections such as diaper webs, which include intermittently spaced fluff pads, are not readily adapted to such wrapping of the rotary anvil. The anvil tends to need longitudinally-spaced reliefs centered on the width of the anvil to allow such fluff pads to pass through the horn/anvil nip. The only way to provide such reliefs under conventional methods is to use a bearer ring, to use a continuous bond line as a bearer, or to cam the horns in unison with the thick-to-thin section transition of the web, into and away from the anvil.

Another problem with the conventional method and apparatus is that positioning more than two horns against a single, common anvil requires the use of multi-repeat anvils. The use of multi-repeat anvils is dictated by the phenomena that only two horns can fit against an anvil at any point on its circumference. The occurrence of any run-out makes getting good bonds on more than one anvil very difficult using multi-repeat anvils.

Adjusting a single horn against a rotary anvil having a single repeat pattern can be accomplished with relative ease, but if the anvil comprises two repeats, making the horn contact both patterns with equal force is more difficult, unless run-out is generally less than 0.0002 inch TIR (Total Indicator Runout). As a result, conventional anvils are costly and not interchangeable.

As used herein, the term "runout" expresses changes in the radius of the rotary anvil roll and/or the rotary ultrasonic horn about the circumference of the respective rotary element.

Conventional methods for rotary bonding include a rotating ultrasonic horn which is mounted in a cantilevered configuration such that the horn is not supported about the surface of the bonding roll. However, such conventional methods have not always been sufficiently satisfactory.

Use of full-width bonding anvil rolls has inherent limitations which adversely affect the bond quality and which in this invention can be at least partially corrected by replacing a cantilever configuration with an in-line or balanced force application which effectively off-sets the effect of application of forces through cantilevered configurations.

In cantilevered configurations, it has been very difficult to maintain the desired degree of consistency and stability of nip force between the bonding rolls and the common anvil roll. As a result, in many conventional methods for rotary full-width bonding, bond quality and/or consistency has been undesirably variable both along the length of the bond region and across the width of the bond region. In addition, processes using cantilevered rotary ultrasonic horns have not been as robust as desired for a manufacturing environment.

When using conventional methods for full-width rotary bonding in such configuration, the bond quality has typically been less than satisfactory along the length of the bond pattern. Such inconsistency in the bond pattern has been due, at least in part, to inconsistent levels of force being effectively applied along the length of respective intermittently applied bond regions of the bond pattern. Typical of such inconsistency is excessive nip loading at such leading edge of the bond region, and insufficient nip loading behind the leading edge of the respective element as the bonding apparatus flexes or deflects in combination with development of the respective bonding region at the nip. Both the excessive nip loading and the insufficient nip loading have resulted in poor bond quality and poor bond consistency.

Under excessive loading, so much energy may be applied to the materials being bonded as to burn through or otherwise excessively soften the materials being bonded, as well as to apply excessive pressure to the softened materials, whereby bonds so formed may be weak, and/or may be uncomfortably harsh to the touch of a wearer's skin. In the alternative, excessive loading can physically damage, as by tearing, the material being bonded.

Generating ultrasonic bonds depends on the combination of frequency and amplitude of the vibrations, the amount of pressure applied, and the time during which pressure is applied. Under conditions of insufficient loading at the nip, too little pressure is applied to the materials intended to be softened thereby, whereby the amount of energy transferred to the elements to be bonded together is insufficient to develop sufficiently strong bonds.

Conventional methods for full-width rotary bonding have used different approaches to diminish the variations in consistency of the interference. For example, the bonding rolls, anvil roll, and support frames have been precisely machined to minimize run-out in the bonding system.

The above-mentioned difficulties of maintaining desired bond quality and consistency along both the length and full-width of the web become even more acute when bonding at least one continuously moving web using multiple rotary ultrasonic horns. Operation of multiple rotary ultrasonic horns includes movement inherent in the continuous vibration of the horns at a given frequency and amplitude to efficiently bond the web, as well as rotation of the horns along the length of a web which may vary in thickness along the length of the web, thus to impose varying resistance to the nip pressure applied by the combination of each horn and the anvil on the web. Under certain conditions, such vibratory movement of the horn, and variation of web thickness, either alone or in combination, may adversely affect bond consistency and quality in the web.

In addition, where the web advancing through the nip, defined between a horn and the anvil, varies in thickness and/or density, the web can apply a correspondingly varying back pressure on the horn and anvil. The overall result of nip variation, then, can be defined in terms of the combination of the degree of variability in manufacturing and mounting the horn and anvil, as well as the degree of variability in thickness of the web moving through the nip between the anvil and horn.

It is an object of this invention to provide bonding apparatus and methods wherein nip pressure is consistent along the lengths and widths of respective bonding regions, for bonding up to the full width of the web.

It is another object to provide rigid and stiff bonding apparatus for up to full width bonding wherein reduced interference can be employed while achieving an effective level of nip loading at the bonding nip.

It is a further object to provide a method for developing bond consistency between bond regions while attenuating pressure and bond variation internal to the respective bond regions, at up to full width bonding of a respective web.

SUMMARY OF THE DISCLOSURE

This invention provides apparatus and methods for developing ultrasonic bonds in combination with a continuously moving web. The apparatus and methods of the invention can be used for developing a bonding pattern extending across up to substantially the full width of a web, optionally multiple webs which may be wholly or in part superimposed one upon the other, using multiple sets of bonding elements spaced along the length of an operations path, each bonding element defining a nip comprising a rotary ultrasonic horn and cooperating rotary anvil. Apparatus and methods of the invention are particularly useful for e.g. ultrasonically bonding selected components of absorbent articles into a web sausage using a rotary ultrasonic horn and cooperating rotary anvil. The bonding apparatus uses multiple rotary ultrasonic horns in combination with the same number of rotary anvils, each anvil generally corresponding in operations width to the width of the cooperating ultrasonic horn, to achieve up to full-width bonding of a web or other substrate material.

In a first family of embodiments, the invention comprehends bonding apparatus disposed along a manufacturing line, the manufacturing line defining at least in part an operations path to be traversed by a web to be acted on by the bonding apparatus, the operations path having a length and a width, and such web having a length and a width. The bonding apparatus comprises support structure supporting the bonding apparatus from an underlying support. The bonding apparatus also comprises a first nip, defined by, in combination, a first set of bonding elements comprising a first rotary ultrasonic horn and a first rotary anvil, and first engagement apparatus bringing the first rotary ultrasonic horn and the first rotary anvil into effective ultrasonic bonding engagement with each other. The first rotary ultrasonic horn and the first rotary anvil are supported from the support structure and rotate in common with each other thereby to convey such web through the first nip. The bonding apparatus also comprises a second nip, defined by, in combination, a second set of bonding elements comprising a second rotary ultrasonic horn and a second rotary anvil, and second engagement apparatus bringing the second rotary ultrasonic horn and the second rotary anvil into effective ultrasonic bonding engagement with each other. The second rotary ultrasonic horn and the second rotary anvil are supported from the support structure and rotate in common with each other thereby to convey such web through the second nip. Each of the rotary anvils has an outer circumference, and an outer circumferential operating surface at the respective outer circumference. The first and second sets of bonding elements are cooperatively disposed at first and second separate and distinct work stations along the length of the operations path, and are disposed at respective first and second different locations across the width of the operations path, so as to act on such web at respective first and second different locations along the width of such web.

The bonding apparatus can be arranged, configured, and timed such that each of the first and second sets of bonding apparatus operate on such web at a common location along the length of such web, optionally thereby to form an uninterrupted pattern of bonding across the width of such web.

Each set of bonding elements can define a bonding width capable of forming a bond pattern of corresponding width in such web, the bonding apparatus including a sufficient number of the sets of bonding elements along the operations path that the sum of the bonding widths of the nips defined by the bonding elements is at least as great as the width of the operations path. The bonding apparatus can be arranged and configured to operate on a such web having a width no greater than the width of the operations path; the bonding apparatus can be further arranged, configured, and timed such that each of the sets of bonding elements operates on such web at a common location along the length of such web, thereby to form an uninterrupted pattern of bonding extending across substantially the entirety of the width of such web.

The bonding apparatus can further comprise a third nip, defined by, in combination, a third set of bonding elements comprising a third rotary ultrasonic horn and a third rotary anvil, and third engagement apparatus bringing the third rotary ultrasonic horn and the third rotary anvil into effective ultrasonic bonding engagement with each other, the third rotary ultrasonic horn and the third rotary anvil being supported from the support structure and rotating in common with each other thereby to convey such web through the third nip. The first, second, and third sets of bonding elements can be arranged at respective first, second, and third separate and distinct locations along the length of the operations path.

The bonding apparatus can include first apparatus for bringing a second web into surface-to-surface relationship with a first such web, after ultrasonic bonds have been formed in such first web at a respective one of the first and second nips, and optionally, second apparatus for bringing a third web into surface-to-surface relationship with at least one of such first and second webs, after ultrasonic bonds have been formed in such first web at a respective one of the sets of bonding elements, and after such first and second webs have been ultrasonically bonded to each other at a respective one of the sets of bonding elements.

The sets of bonding apparatus can be adapted and configured to apply ultrasonic energy to such second web to thereby bond such second web to such first web. Similarly, the sets of bonding apparatus can be adapted and configured to apply ultrasonic energy to such third web to thereby bond such third web to at least one of such first and second webs.

The bonding apparatus can be arranged and configured to apply ultrasonic energy, and therefore to create ultrasonic bonds in a such web, by at least one of the sets of bonding elements overlapping corresponding ultrasonic bonds developed by another of the sets of bonding elements, such that at least one of the ultrasonic horns applies ultrasonic energy to a respective such web at a location whereat ultrasonic bonds have been already formed in such web by the bonding apparatus.

Preferably, at least one rotary anvil has an operating width, at the respective nip, of about 0.6 inch to about 4 inches, more preferably about 1 inch to about 3 inches, and still more preferably about 2 inches.

Ones of the rotary anvils and/or ones of the rotary ultrasonic horns can comprise metal selected from the group consisting of aluminum, iron, monel titanium, and steel, and alloys and mixtures comprising aluminum, iron, monel, titanium and steel.

In some embodiments, the operating surfaces of the rotary anvils comprise arrays of projections thereon extending around the respective circumferences of the rotary anvils, and across entireties of respective transverse widths of the rotary anvils, thereby covering substantially the entireties of respective operating surfaces of respective rotary anvils.

In other embodiments, the operating surface of a respective one of the rotary anvils comprises an array of projections thereon, wherein the array of projections covers a portion but not all of one of the circumference or width of the operating surface of the respective rotary anvil.

Each rotary anvil can comprise a first relatively lesser radius base portion extending about a first portion of the circumference of the respective the rotary anvil, and a second relatively greater radius bonding portion extending about a second portion of the circumference of the rotary anvil. The second radius is preferably about 0.01 inch to about 0.07 inch greater than the first radius.

The bonding apparatus can further comprise a cascading drive wherein timing of the second set of bonding elements, and any subsequent sets of bonding is derived from driving of the first set of bonding elements.

In a second family of embodiments, the invention comprehends apparatus for creating ultrasonic bonds in concurrently advancing webs, thus constructing a composite web having a length and a width. The apparatus comprises apparatus for bringing first and second such webs into surface-to-surface relationship with each other, each such web comprising a number of imaginary segments, each segment of each such web having a segment width comprising a separate and distinct portion of the width of such respective web, and extending along substantially the entire length of such respective web, the multiple segments in each such web being substantially parallel to each other. The apparatus also comprises a number n1 of rotary anvils, each respective rotary anvil having a width substantially equal at least to the width of a respective one of the segments, each respective rotary anvil further having a circumference, and an operating surface defined by an outer circumferential surface, each respective rotary anvil being mounted for rotation about a rotary anvil axis. The apparatus further comprises a number n2 of rotary ultrasonic horns, each respective ultrasonic horn being mounted about a horn axis, each respective ultrasonic horn being paired with a respective rotary anvil to form a respective bonding nip. The ultrasonic horns and the rotary anvils collectively are mounted and configured such that the ultrasonic horns and the rotary anvils can be brought together to define the respective nips therebetween, and wherein the rotary anvils and the ultrasonic horns can rotate in common with movement of such web segments through the respective nips, the number of nips being substantially the same as the number of such web segments.

In a third family of embodiments, the invention comprehends a method of creating ultrasonic bonds in a web having a length and a width. The method comprises transporting the web through bonding apparatus disposed along a manufacturing line, the manufacturing line defining at least in part an operations path to be traversed by the web, the operations path having a length and a width. The transporting of the web includes transporting the web through a first nip, defined by, in combination, a first set of bonding elements comprising a first rotary ultrasonic horn and a first rotary anvil, with the web therebetween, the first rotary ultrasonic horn, and the first rotary anvil being supported from support structure, and rotating in common with each other thereby to convey the web through the first nip. The transporting of the web also includes transporting the web through a second nip, defined by, in combination, a second set of bonding elements comprising a second rotary ultrasonic horn and a second rotary anvil, with the web therebetween, the second rotary ultrasonic horn and the second rotary anvil being supported from the support structure, and rotating in common with each other thereby to convey the web through the second nip. Each of the rotary anvils has an outer circumference, and an outer circumferential operating surface at the respective outer circumference. The first and second sets of bonding elements are cooperatively disposed at first and second separate and distinct work stations along the length of the operations path, and are disposed at respective first and second different locations across the width of the operations path, so as to act on the web at respective first and second different locations along the width of the web. The method also comprises bringing the respective sets of rotary anvils and ultrasonic horns into bonding engagement with each other at respective bonding portions of the respective rotary anvils and ultrasonic horns, and further comprises timing application of the bonding engagements so as to apply at least three of the respective sets of bonding elements to the web at a common location along the length of the web.

The method can include employing a sufficient number of sets of the bonding elements, arranged across the width of the web, to create bonds across substantially the full width of the web.

The method can include drawing the web along the operations path across the respective rotary anvils, and thus through the nips defined between the rotary anvils and respective ones of the ultrasonic horns, at a threading speed of at least about 40 feet per minute.

The method preferably includes drawing apparatus, drawing the web along the operations path across the respective rotary anvils, and thus through the nips defined between the rotary anvils and respective ones of the ultrasonic horns, at a speed of at least about 600 feet per minute, more preferably at least about 1000 feet per minute.

The method can include mechanically loading each set of bonding elements at up to about 400 pounds of pressure per inch linear width across an energy-applying portion of the nip as defined by the respective rotary anvil and corresponding ultrasonic horn.

The rotary anvils each can have a pattern of raised elements on the respective circumferential surface, each respective set of bonding elements developing bonds in the web in accord with the raised elements.

The method can comprise drawing a second web, having a length and a width, into surface-to-surface engagement with a first web at at least one of the respective first and second nips, and employing the respective set of bonding elements at the respective nip to bond the second web to the first web, thereby to define a combination web.

The method can include disposing the second web in surface-to surface engagement with the first web at each of the respective nips, and employing the respective sets of bonding elements at the respective nips to bond the first and second webs to each other.

The method can include employing sufficient number of sets of bonding elements, arrayed across the widths of the first and second webs, to bond the second web to the first web across the entirety of the width defined by the surface-to-surface engagement of the first and second webs with respect to each other.

The method can include drawing a third web, having a length and a width, into surface-to-surface engagement with at least one of the first and second webs after the ultrasonic bonding of the first and second webs to each other, and applying ultrasonic energy to the third web at a third location downstream from the first and second sets of bonding elements, thereby bonding the third web to the combination web.

Ultrasonic bonding can be effected by at least one of the sets of bonding elements overlapping, along the width of the web, with ultrasonic bonding effected by at least one other of the sets of bonding elements, such that at least one rotary ultrasonic horn applies ultrasonic energy to previously ultrasonically bonded portions of the web.

In a fourth family of embodiments, the invention comprehends a method of fabricating a composite web having a length and a width wherein first and second webs are bonded to each other over substantially the entirety of a common width. The method comprises drawing the first and second webs into surface-to-surface relationship with respect to each other over a common width, and thereby defining a web combination. The method further comprises passing the web combination through first and second nips spaced at first and second locations along a length of a manufacturing line, each nip being defined by, in combination, a set of bonding elements comprising a rotary ultrasonic horn and a rotary anvil. The method also comprises bringing each respective set of bonding elements together in defining the respective nips, and correspondingly developing suitable pressure in the nips to create ultrasonic bonds. The method further comprises activating ultrasonic energy in the respective rotary ultrasonic horns, and rotating the respective ultrasonic horns and rotary anvils in common with movement of the web combination through the respective nips, thereby applying pressure to the web combination, and correspondingly creating ultrasonic bonds in the web combination as the web combination passes through the nips, and thereby transforming the web combination into a combination web.

The method can include intermittently applying pressure to the web combination through the respective nips and correspondingly creating longitudinally-spaced intermittent bonds in the web combination at the respective nips, and wherein the bonds created by successive such nips are positioned in registration with respect to each other across the width of the combination web.

The method can include arranging the respective sets of bonding elements across the width of the web combination at respective longitudinally spaced locations with combined effective bonding widths of the respective nips effecting bonding at substantially all locations across the width of the web combination, such that the entireties of the common widths of the first and second webs are bonded to each other across the entirety of the common width of the combination web, optionally along substantially the entire length of that portion of the combination web which has passed through the respective nips, or optionally at longitudinally-spaced locations along the length of the combination web.

The method can include developing bonds along the entirety of the width of the web combination, including width segments projected from only one of the two webs.

The method can include disposing a third web onto the combination web after the ultrasonic bonding of the first and second webs to each other at the first and second locations, ones of the sets of bonding elements applying bonding levels of ultrasonic energy to at least one of the combination web and the third web at locations where the third web overlies the combination web, thereby bonding the third web to the combination web.

The method can include applying ultrasonic bonding energy at successive ones of the sets of bonding elements wherein a subsequent set of bonding elements overlaps a portion of the width of ultrasonic bonding applied by a more upstream set of bonding elements in the manufacturing line, such that at least one of the rotary ultrasonic horns applies ultrasonic energy to previously ultrasonically bonded portions of at least one of the first and second webs.

Similarly, the method can include applying ultrasonic bonding energy at successive ones of the sets of bonding elements wherein a subsequent set of bonding elements overlaps a portion of the width of ultrasonic bonding applied by a more upstream set of bonding elements in the manufacturing line, such that at least one of the rotary ultrasonic horns applies ultrasonic energy to previously ultrasonically bonded portions of at least one of the first, second, and third webs.

The method can comprise deriving timing of the second set of bonding elements, and any subsequent sets of bonding elements, from driving of the first set of bonding elements.

In some embodiments of the method, the rotary anvils comprise first relatively lesser radius portions extending about respective first portions of circumferences of the rotary anvils, and second relatively greater radius bonding portions extending about second portions of the circumferences of the rotary anvils.

The method can include employing a rotary anvil wherein the greater radius is about 0.01 inch to about 0.07 inch greater than the lesser radius.

The first web can have a greater width than the second web, whereupon the method can include bonding the full width of the second web to the first web.

The invention is not limited in its application to the details of the construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

This invention provides apparatus and methods for developing ultrasonic bonds in combination with a continuously moving web. The apparatus and methods of the invention can be used for developing a bonding pattern extending across up to substantially the full width of a web, optionally multiple webs which may be wholly or in part superimposed one upon the other, using multiple sets of bonding elements spaced along the length of an operations path, each bonding element defining a nip comprising a rotary ultrasonic horn and cooperating rotary anvil. Apparatus and methods of the invention are particularly useful for e.g. ultrasonically bonding selected components of absorbent articles into a web sausage using a rotary ultrasonic horn and cooperating rotary anvil. The apparatus and methods can be used for bonding two webs to each other to form a composite e.g. substrate material, and wherein the composite substrate material is optionally used subsequently in an absorbent article such as, for example, a disposable diaper. The present invention is particularly useful in bonding one or more layers of material which preferably comprise, at least in part, thermoplastic polymers. The bonding apparatus uses multiple rotary ultrasonic horns in combination with the same number of rotary anvils, each anvil generally corresponding in operations width to the width of the cooperating ultrasonic horn, to achieve up to full-width bonding of a web or other substrate material. The use of multiple single-repeat anvils is desirable over conventional methods of full-width bonding using a full-width anvil, since individual single repeat anvils are less costly and easier to set up and operate than a single full-width anvil.

The bonding apparatus of the invention achieves up to full-width bonding by disposing sets of multiple ultrasonic horns and corresponding rotary anvils along and across the operations path but timed to produce coordinated and optionally repeated bond patterns across and optionally along the length of a web sausage being formed along the operations path. Other advantages of the present invention include the relatively smaller, single repeat rotary anvils being easier to make, less expensive, easier to install, set up, and change than a single, relatively larger, relatively heavier, anvil. Additionally, if cross-direction spacing of bonds needs to be changed, the separate sets of bonding elements, each including an ultrasonic horn and a rotary anvil, can be shifted rather than having to make a new full-width anvil.

In particular, ultrasonic bonding apparatus and methods of the present invention can be used, for example, to form a waist band in a pull-up disposable absorbent article. Such waist band may be formed e.g. by bonding a waist band element to a substrate web or by forming bonds internally within the web. In addition, bonding apparatus and methods of the present invention can be used in manufacture of personal care absorbent articles other than pull-up absorbent articles, such as, for example, diapers, feminine care products, incontinence garments, hospital gowns, and the like. All such alternative methods, configurations, and articles are contemplated as being within the scope of the present invention. In light of the disclosure herein, other uses of the invention in connection with absorbent and other articles of manufacture will be obvious to those skilled in the art.

Where the invention is used in making waist bands, the waist bands may be aligned along the web such that bonding of the waist band regions represents intermittent and timed discontinuous bonding across the width of the web, wherein areas of the web disposed between longitudinally spaced waist-bonded regions are not necessarily bonded by the bonding apparatus which forms the waist bands.

Figure 1A:
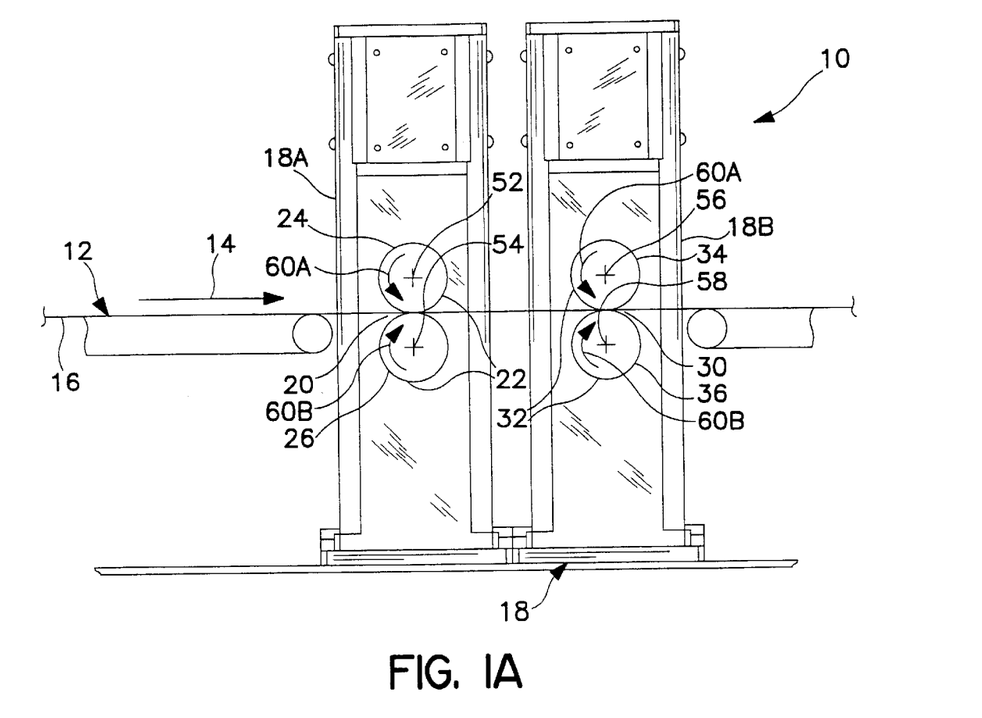
FIG. 1A shows a representative side elevation view of ultrasonic bonding apparatus of the invention.

Referring to the drawings, FIG. 1A illustrates general locations of major elements of an exemplary embodiment of bonding apparatus of the invention. As illustrated in FIG. 1A, bonding apparatus 10 of the invention is disposed along a manufacturing line 12, manufacturing line 12 defining at least in part an operations path indicated by arrow 14 and being traveled by a web 16 which is acted on by the bonding apparatus. Bonding apparatus 10 generally comprises a support structure 18, a first nip 20 and at least a second nip 30. First nip 20 is defined by, in combination, a first set of bonding elements 22 comprising a first rotary ultrasonic horn 24 and a first rotary anvil 26, and first engagement apparatus 28 (FIG. 2A) bringing first rotary ultrasonic horn 24 and first rotary anvil 26 into effective ultrasonic bonding engagement with each other. Similarly, second nip 30 is defined by, in combination, a second set of bonding elements 32 comprising a second rotary ultrasonic horn 34 and a second rotary anvil 36, and second engagement apparatus 38 (FIG. 2A) bringing second rotary ultrasonic horn 34 and second rotary anvil 36 into effective ultrasonic bonding engagement with each other.

First rotary ultrasonic horn 24 and first rotary anvil 26 are supported from support structure segment 18A and rotate in common with each other, as indicated by arrows 60A, thereby to convey such web 16 through first nip 20. Additionally, second rotary ultrasonic horn 34 and second rotary anvil 36 are supported from support structure segment 18B and rotate in common with each other, as indicated by arrows 60B, thereby to convey such web 16 through second nip 30.

Figure 2A:
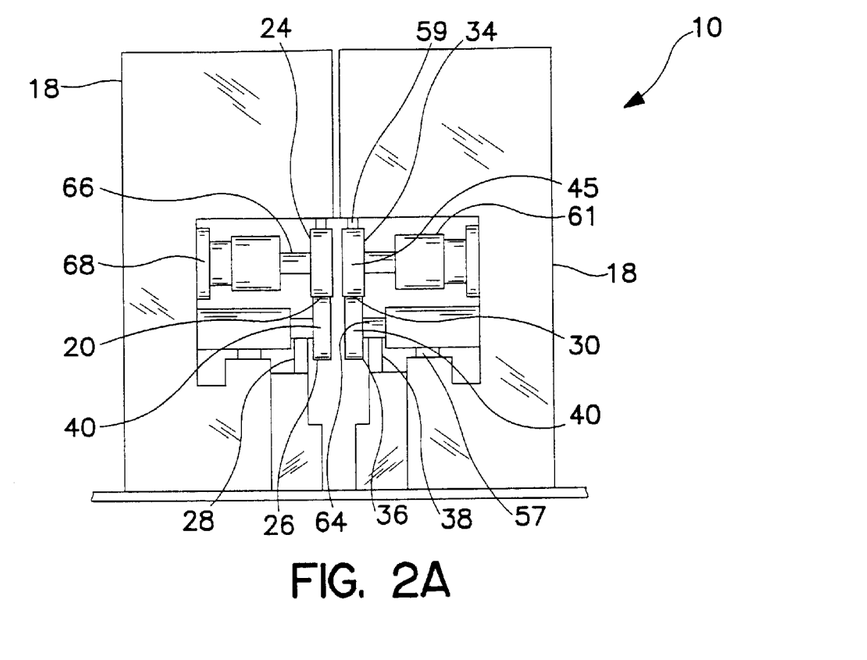
FIG. 2A shows a front elevation view of a second embodiment of ultrasonic bonding apparatus of the invention.
Figure 2B:
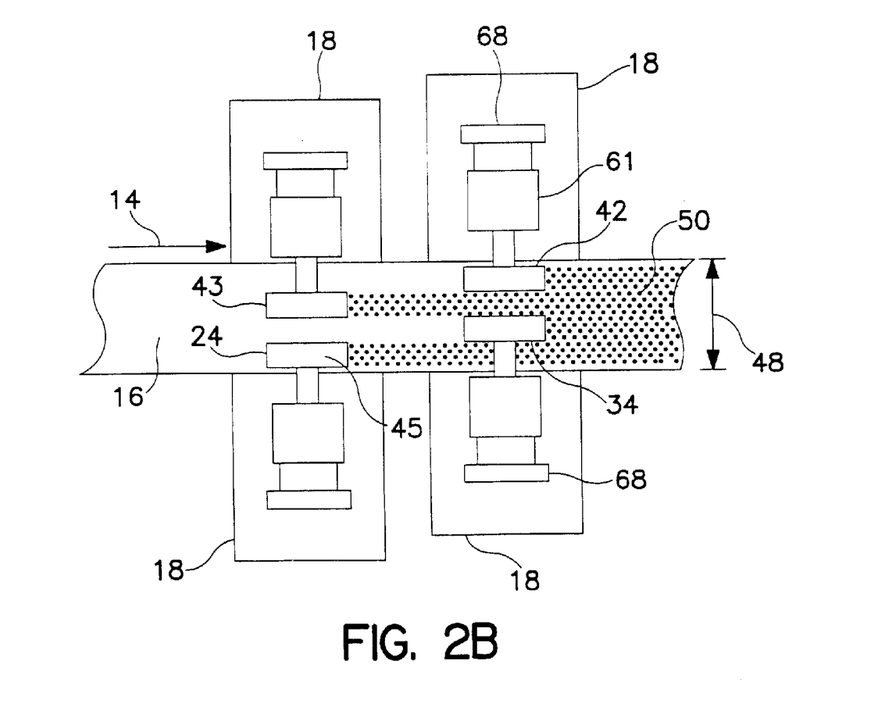
FIG. 2B is a representative top view of the embodiment illustrated in FIG. 2A.

First nip 20 and second nip 30 form a series of nips. Each nip, and thus each set of ultrasonic horn and rotary anvil, is supported by a respective support structure, or segment or a portion of a common support structure 18. In some embodiments, all of the support structure segments and respective attached sets of bonding elements are located on the same side of web 16. Alternatively, in other embodiments, a first support structure segment and respective attached set of bonding elements are located on a first side of web 16 and a second support structure segment and respective attached set of bonding elements (e.g. ultrasonic horn and rotary anvil) are located on a second opposing side of web 16, as illustrated in FIGS. 2A and 2B. As usual in manufacturing operations, support structure 18 can be supported from the floor, the ground, or can be suspended from a suitable overhead support. Ground or floor support is preferred.

Figure 1B:
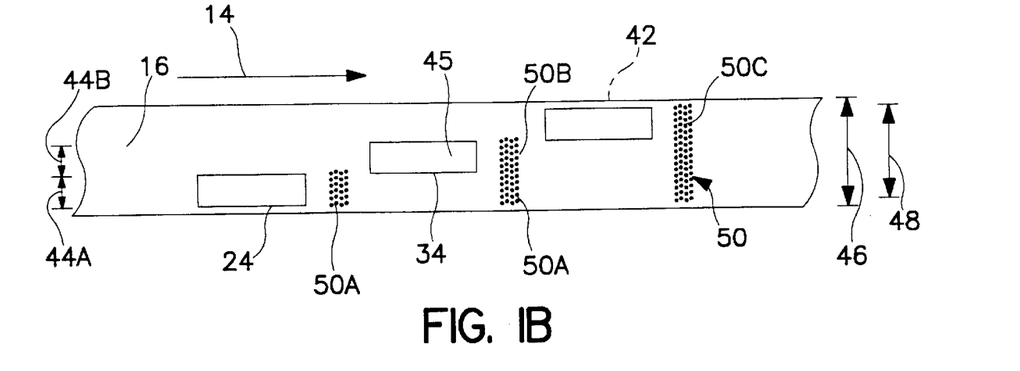
FIG. 1B is a representative top view showing alignment, across the width of the web, of rotary ultrasonic horns illustrated in FIG. 1A.

Some embodiments represent a staggered arrangement of sets of bonding elements, wherein a first set of bonding elements is one or both transversely and longitudinally displaced from a second set of bonding elements, thereby allowing the resultant bonding pattern of each set of bonding elements to be disposed at any locus across the transverse width of the web(s). FIGS. 1B, 2A, and 2B illustrate exemplary staggered arrangements of the invention.

Referring to FIG. 1A, support structure 18 is fabricated from a rigid, stiff material such as metal. Preferred metals include a variety of well known stiff and rigid steel or cast iron compositions.

Horn 24 has an outer peripheral bonding surface 45 (FIG. 3) which contacts and acts upon substrate web 16, and which rotates about a horn axis 52 in the direction indicated by arrow 60A (FIG. 1A). Rotatable rotary anvil 26 is supported by anvil support apparatus 57 adjacent horn 24. Rotary anvil 26 is configured to rotate about anvil axis 54 (FIG. 3) in the direction indicated by arrow 60B (FIG. 1A) associated therewith to press substrate web 16 against bonding surface 45 of horn 24, thereby creating bonds at substrate web 16.

A horn support apparatus 59 (FIG. 2A) can be used in combination with anvil support apparatus 57 to promote sufficient force urging the respective horn and anvil together to provide sufficient pressure at e.g. nip 20 to create ultrasonic bonds in one or both of a single web or multiple webs passing through the respective nip. The bonding process preferably operates in combination with at least one continuous web, whether the web operates as a support for other elements being bonded to each other, as a continuous element being bonded either to another continuous element or to discrete spaced elements, or as a continuous element being bonded internally within its own structure. Web 16 is continuously moving along the operations path in the direction indicated by arrow 14.

In the embodiments illustrated in FIGS. 1B, 2A, 2B, 3, and 4, outer peripheral bonding surface 45 of the ultrasonic horn is contacted and supported by horn support apparatus 59 (FIG. 2A), which support apparatus maintains the horn in a substantially fixed location while the horn is being used to form ultrasonic bonds at e.g. respective nip 20. As representatively illustrated in the drawings, in this invention, each respective ultrasonic horn is preferably mounted above the respective rotary anvil at each respective set of bonding elements.

Figure 3:
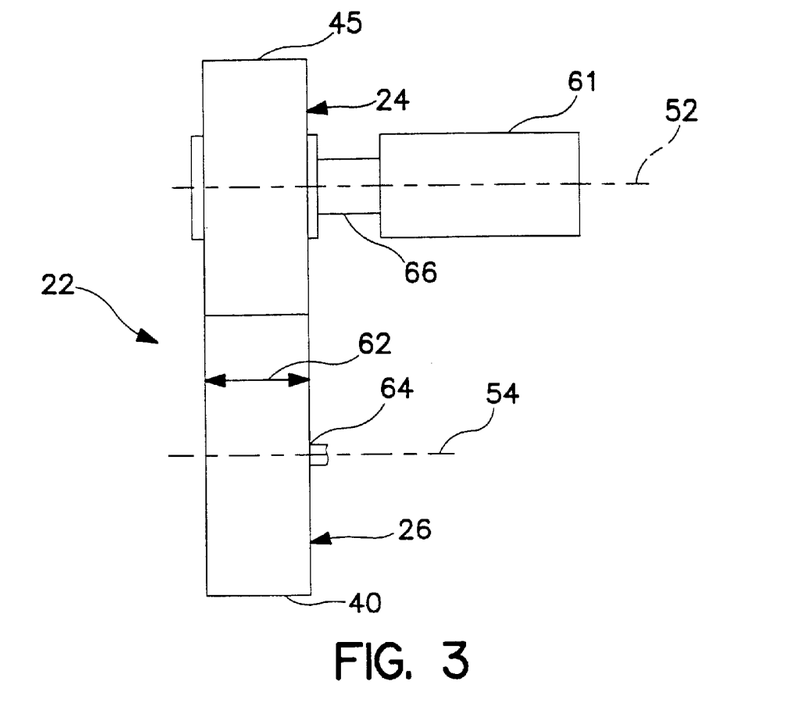
FIG. 3 shows an enlarged front elevation view of a set of the bonding elements.

As representatively illustrated in FIG. 1A, first horn 24 is configured to rotate about first horn axis 52, and second horn 34 is configured to rotate about second horn axis 56, both in the direction indicated by arrows 60A associated therewith. Referring to FIG. 3, each horn is preferably connected to a shaft 66 by suitable means such as by using a continuous one-piece design or studs, but other attachment means are contemplated. Other rotating components associated with each respective horn can be similarly connected to each other as desired, to rotate in common with each other. Horn 24 is accordingly mounted from support structure 18 through shaft 66 and horn support apparatus 59.

In general, conventional ultrasonic excitation crystals (piezoelectric crystals) are operationally connected to a respective horn through suitable amplifier and wave guide structure 61, so as to implement radially-directed ultrasonic vibrations in the annular horn. Amplifier and wave guide structure 61 can also function as a portion of shaft 66 supporting the horn. Each rotary horn is generally disc-shaped although the precise outer configuration of the horn can vary considerably from horn to horn in accord with other horn variables.

As representatively illustrated in FIGS. 1A, 1B, 2A, 2B, 3, 5A, and 5B, each horn generally comprises a shaped metal object. Representative examples of rotary ultrasonic horns which can be used in the present invention are described in U.S. Pat. No. 5,096,532 to Neuwirth et al and U.S. Pat. No. 5,110,403 to Ehlert, both of which are herein incorporated by reference in their entireties. In general, a rotary ultrasonic horn, of the invention, can be made from any metal having suitable acoustical and mechanical properties. Exemplary suitable metals include aluminum, monel, titanium, and some alloy steels. Titanium is preferred for its overall combination of desirable properties. In general, variables such as diameter, mass, width, thickness, and configuration of the rotary ultrasonic horn can be varied within substantial ranges. However, such variables, along with composition of the horn, do determine the particular frequency and amplitude at which a particular rotary ultrasonic horn resonates, which can affect bond quality and consistency. In particular, diameter, width, and side configuration of the horn are selected such that the horn, upon being excited by ultrasonic energy at a desired frequency, resonates such that the excited end moves substantially in phase with movement of the excitation source, and the bonding surface 45 also moves in a suitable pattern which is directed generally perpendicular to annular bonding surface 45 of the horn.

Typically, ultrasonically induced movements of the opposite ends of the horn relative to each other may be out of phase. For example, the rotary ultrasonic horn illustrated in the drawings can be excited at a frequency of from about 18 kHz to about 60 kHz. Each horn typically has a diameter of from about 1.5 inch to about 7.5 inches. Thickness of the horn at rotational axis 52 is typically from about 0.25 inch to about 6.0 inches. The horn can have a mass in the range of from about 0.12 pounds to about 65.0 pounds.

Each horn can be energized by a drive mechanism 68 (FIG. 2B) which rotates and ultrasonically excites the respective horn. Drive mechanism 68 can include the above noted piezoelectric crystals, amplifier, and part or all of the wave guide. Any mechanism which provides the desired rotation and ultrasonic excitation can be used in the present invention. Such mechanisms are well known to those skilled in the art.

For example, drive mechanism 68 can be a mechanism commercially available from Dukane Corporation, St. Charles, Ill. or a similar system available from Branson Sonic Power Company, Danbury, Conn. Namely, a generator such as a Dukane 1800 watt, 20 kHz generator (Part No. 20A1800), is connected to a drive assembly, such as a Dukane drive assembly (Part No. 110-3123), to provide the necessary ultrasonic excitation. Any combination of boosters, such as a Dukane 1:1 booster (Part No. 2177T) and a Dukane 2:1 booster (Part No. 2181T), may then be attached to the drive assembly. Finally, a rotary ultrasonic horn of the present invention may be attached to the boosters. Thus, the combination of generator, drive assembly, and boosters, functioning as drive mechanisms 68, rotates and ultrasonically excites a respective rotary ultrasonic horn thereby providing the ultrasonic energy and rotational motion necessary to bond substrate web 16, and optionally web 17 (FIGS. 5A, 5B), or substrate web 16 and discrete elements, to each other under suitable nip pressure.

The drive is generally, a modified cascading drive. When continuous, non-timed bonding is being performed a cascading drive is not required. When timed bonding is being performed, the first set of bonding elements is timed to the product being fabricated, and timing in each succeeding set of bonding elements is derived from timing of the first set of bonding elements. Thus, if the bond needs adjustment changing timing of the first set of bonding elements changes the timing on all subsequent sets of bonding elements.

FIG. 1B is an top view of first, second, and third sets of bonding elements represented by horns 24, 34, 42. Web 16 travels in the direction of the operations path and is operated on by first ultrasonic horn 24 at nip 20 defined by horn 24 and first rotary anvil 26 (FIG. 1A), thus forming a portion 50A of the width of intermittent bond pattern 50 comprising a first portion of width 46 of the web. Web 16 is then affected by second ultrasonic horn 34 creating a nip with second rotary anvil 36 (FIG. 1A), thereby forming a second portion 50B of the width of bond pattern 50 in registration with portion 50A, and to extending across a middle portion of width 46 of web 16. Web 16 is further acted upon by third ultrasonic horn 42 creating a nip with a third rotary anvil (not shown), thereby forming a third portion 50C of the width of bond pattern 50 in registration with portions 50A and 50B, the combination of bond potions 50A, 50B, and 50C forming a single bond element having a combined width 48 extending across substantially full width 46 of web 16. As illustrated in FIG. 1B, width 48 of bond element 50 can be less, optionally substantially less, than width 46 of the web.

Each set of bonding elements represents a bonding width defined by the width of a resultant bond pattern created in the nip of the respective ultrasonic horn and rotary anvil. Referring to FIGS. 1A and 1B, for example, horn 24 and rotary anvil 26 form a nip 20 resulting in a bond pattern 50A having a bonding width 44A. Correspondingly, horn 34 and rotary anvil 36 form nip 30 resulting in bond pattern 50B having a second bonding width 44B.

The combined operating width or widths for the bonding apparatus is defined generally by the sum of all bonding widths defined by each of the respective widths of resultant bond patterns created in the respective nips of the respective ultrasonic horns and respective rotary anvils, minus any overlap of the bonding patterns. The bonding apparatus of the invention does contemplate longitudinal spacing in relation to the operations path between adjacent bonding widths defined by each of the respective widths of resultant bond patterns created in the respective nips of the respective ultrasonic horns and respective rotary anvils.

Referring to FIG. 2B, a top view of four nips is represented by the respective horn of each of the four sets of bonding elements forming four respective nips (not shown). First horn 24 and its complimentary rotary anvil form a first nip; similarly, second horn 34, third horn 42, and fourth horn 43 and their respective complimentary rotary anvils form respective second, third and fourth nips. The composite of the bonding widths of the four nips results in the bonding apparatus having an operating width 48 substantially covered by resultant bond pattern 50.

Addressing now the support of each set of bonding elements as illustrated in the drawings, while the description refers to first set of bonding elements 22 including first horn 24 and first rotary anvil 26, the description applies as well to other sets of bonding elements of the bonding apparatus. Accordingly, when properly set up with the axes of the horn, horn support apparatus 59, and rotary anvil 26, parallel to each other and aligned in a single plane, the pressure applied by the outer working surface of horn support apparatus 59 to outer bonding surface 45 of the horn influences the spacial location and orientation of outer bonding surface 45 of the horn to track parallel to outer operating surface 40 of rotary anvil 26, such that outer bonding surface 45 of horn 24 can more closely track the incoming and outgoing portions of the specified operations path 14 traversed by web 16, with only minimal deviation of bonding surface 45 from the path in accord with pressure applied at nip 20.

Referring to FIGS. 1A, 2A, 3, 4, 5A, and 5B, rotary anvil 26 is configured to rotate about anvil axis 54, and to press substrate web 16, optionally along with a second element or web 17 to be bonded thereto, against bonding surface 45 of ultrasonic horn 24. The rotary anvil is connected to a shaft 64 which is rotatably mounted and connected to support structure 18. In general, rotary anvil 26 can be made from any metal having suitable mechanical properties for tolerating the use environment, and the function of urging the materials to be bonded into bonding engagement with surface 45 of the ultrasonic horn. Suitable metals include, for example and without limitation, certain of the alloy steels.

Typically, rotary anvil 26 has a width 62 of about 0.25 inch to about 20 inches, preferably from about 0.25 inch to about 6 inches, and most preferably from about 1 inch to about 4 inches.

Figure 4:
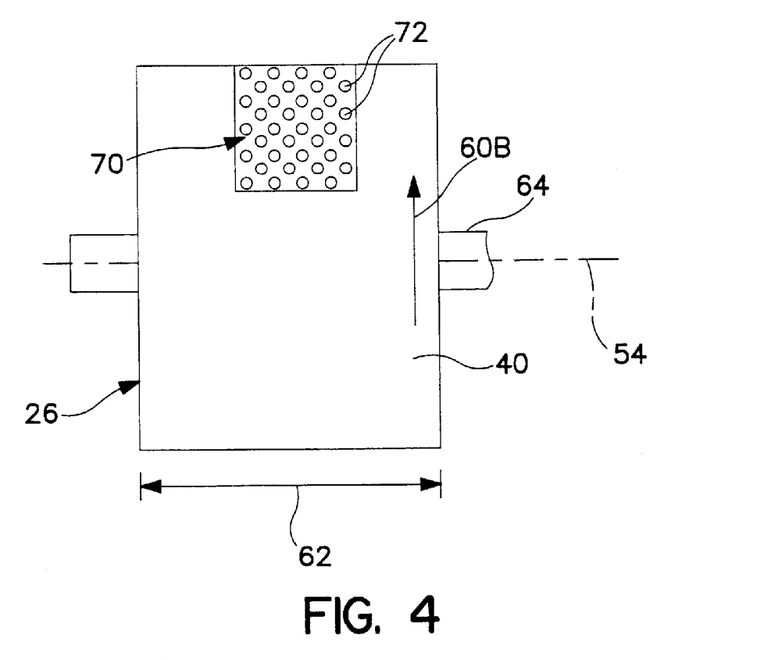
FIG. 4 illustrates an exemplary rotary anvil useful in the invention, including a raised bonding region.
Figure 4A:
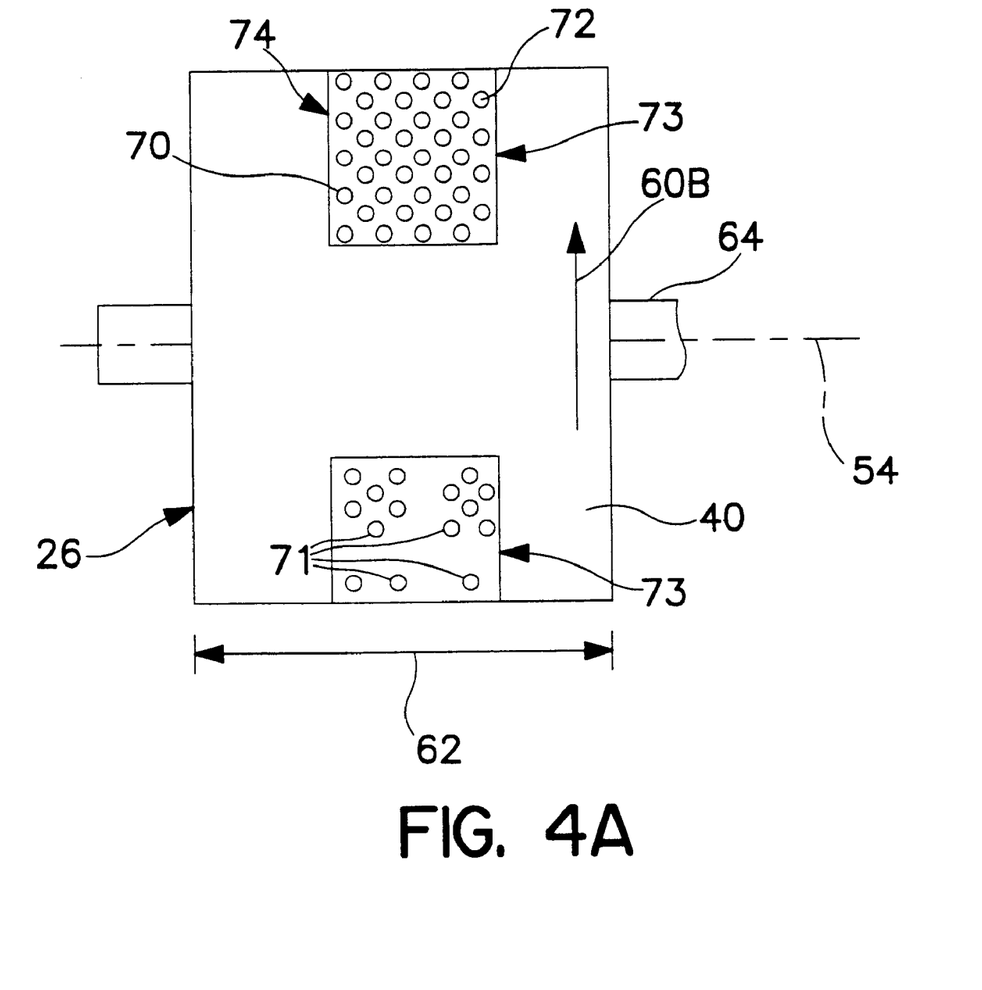
FIG. 4A illustrates another exemplary rotary anvil useful in the invention, including first and second bonding regions.

Operating surface 40 is configured to bond the substrate webs 16, 17, or a substrate web 16 and discrete elements, to each other, or to bond web 16 internally within itself, at bond locations arranged in a predetermined bond pattern on operating surface 40. For example, as representatively illustrated in FIGS. 4 and 4A, anvil surface 40 of rotary anvil 26 can have an array 70 or arrays 71 of projections 72 thereon. Array 70 of projections 72 can extend completely around the circumference of operating surface 40, and across the entirety of the transverse width of operating surface 40, thereby to cover substantially the entirety of the operating surface of the rotary anvil. In the alternative, projections 72 can be disposed, as shown in FIG. 4A, in discrete spaced arrays 71 which cover portions but not all of either or both of the circumference or width of the operating surface, of rotary anvil 26. FIG. 4A, as viewed, shows first and second (upper and lower)different bonding regions 73 on rotary anvil 26, for purposes of concisely illustrating diverse bond patterns. It will be understood that a rotary anvil of the invention will typically bear only one bonding region, and to the extent such anvil roll bears more bonding regions, the bonding patterns defined in the respective bonding regions will all be the same or substantially the same.

The width of a given bonding region 73 defines the maximum width of the bond or bond portion (e.g. 50A, 50B, 50C) which can be formed using the respective anvil roll 26. The width of the bond portion may be less than the width of the bond region if the width of the respective ultrasonic horn is smaller than the width of the bonding region 73. The operating width of the anvil roll (e.g. represented by width 44A) is thus the smaller of the width of the bonding region 73 or the width of the respective horn. In general, the operating width of the rotary anvil at the nip, and thus the width of the resulting bond, measured perpendicular to the operations path is at least about 0.6 inch up to about 4 inches. Lesser and greater widths are possible but are less attractive both from an economics perspective and from the perspective of ease of operations. More desirable operating width is about 1 inch to about 3 inches, both because of economics and because of ease of operations.

Where an overall pattern is used, the projections cover a constant width along the entire circumference of rotary anvil 26, and continuous and uniform bonding force is applied by rotary anvil 26 against horn 24. To the extent suitable web or other material is in the nip between the horn and anvil, the continuous array of projections provides for creating a continuous bond along the corresponding length of the web over substantially the entirety of the operating width of each respective nip.

Breaks in the array of projections, whether partial or full width, typically result in bonds being developed over less than the entirety of the area of the material passing through the nip, as shown in FIG. 1B. Namely, the extent to which bonds are developed in nip 22, across the width of the web, depends on the degree to which the array of projections 72 or other elements extend across the width of the web. The pattern of projections about the circumference and width of the anvil generally controls the longitudinal arrangement of the bond pattern which can potentially be developed on the materials passing through the nip.

Projections 72 can be any known size or shape, any orientation or distribution, depending on the bond pattern desired for the material passing through the nip. A preferred, but not limiting bond pattern, is represented by about 30 percent bond area and about 70 percent non-bond area.

Figure 5A:
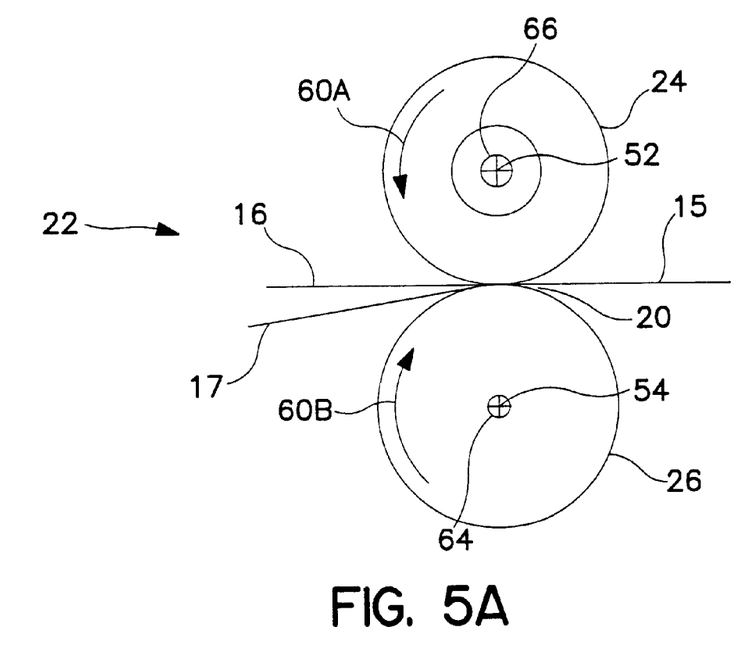
FIG. 5A shows a side elevation view of a first exemplary rotary anvil, and associated rotary ultrasonic horn.
Figure 5B:
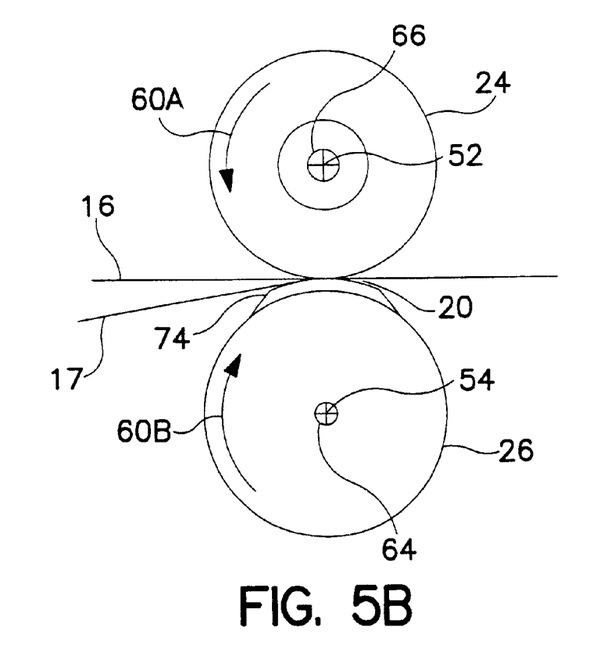
FIG. 5B shows a side elevation view of a second exemplary rotary anvil, and associated rotary ultrasonic horn.

Referring to FIG. 4A, in preferred embodiments especially of interest in this invention, surface 40 of rotary anvil includes a raised element 74, also known as a "bump," illustrated in FIGS. 4A, 5B, defining bond region 73. In such embodiments, array 70 or arrays 71 of projections 72 are disposed on raised element 74. Raised element 74 is particularly useful when one of substrate webs 16, 17, or web 16 and discrete elements to be bonded thereto, have varying thicknesses. The principle of raised element 74 is to provide a first larger radius portion of the rotary anvil for providing bonding activity at thinner portions of the web, and to provide a second relatively lesser radius portion of the rotary anvil. The second lesser radius portion of the rotary anvil may provide clearance between the rotary anvil and the horn for passage of thicker portions of the web between the rotary anvil and the horn. In general, the greater radius portion of the rotary anvil is about 0.01 inch to about 0.07 inch greater than the lesser radius portion of the rotary anvil.

Rotation of the rotary anvil can be timed such that raised element 74 of rotary anvil surface 40 presses thinner portions of substrate webs against bonding surface 45 of horn 24 with sufficient force to develop ultrasonic bonds at thinner portions while thicker portions of the web pass through the nip at the lesser radius portions of the rotary anvil. Typical of such thicker portions of the web are absorbent pads such as are used in disposable diapers, feminine hygiene pads, and the like. The thicker portions of the web are typically not bonded at the respective nip, but may be correspondingly bonded if desired.

Such timing of activation of the ultrasonic bonding can be beneficial to establishing and maintaining desirable levels of interference between bonding surface 45 and surface 40 of the rotary anvil at the raised elements, while enabling the thicker portions of the web or other work piece to pass through the nip without being crushed. The rotary anvil and ultrasonic horn, in combination, generally define an interference of zero up to no more than about 0.008 inch at a bonding nip therebetween, interference being defined as movement of horn and/or support apparatus toward each other subsequent to the horn and anvil touching each other.

Referring to FIG. 5B, when raised element 74 passes into and through nip 22, the presence of raised element 74 in combination with the planned interference between the raised element and the horn, imposes a relatively increased level of stress on both the horn and the anvil in order to provide suitable force at the nip to develop ultrasonic bonds using the ultrasonic energy being expressed in horn 24. Correspondingly, when the raised element is not in the nip, namely when a lesser radius portion is in the nip, the nip force, if any, is typically substantially less than the force required to form ultrasonic bonds. Thus, as the anvil and the horn rotate in an ongoing bonding process, the raised element repeatedly passes into and out of the nip, repeatedly stressing both the anvil support structure and the horn structure, as well as support structure 18 onto which are mounted both the anvil support structure and the horn support structure.

Each introduction of increased stress includes both passive loading and impact loading. Particularly the impact loading can introduce significant variation in effective load along the machine direction length of the bonding surface defined by the raised element, due to reflex reaction of the respective support structures. As a result, bond strength can vary longitudinally along the length of an array of bond elements represented by the length of the raised element, and in some instances can vary along the width of such array.

The primary lifting force on rotary anvil 26 is transmitted from first engagement apparatus 28. In preferred embodiments, engagement apparatus 28 applies a sufficient lifting force to provide a resultant pressure in the nip of at least about 400 pounds per inch width of the nip. The amount of lifting force applied by engagement apparatus 28 should be sufficient to provide relative stability to rotary anvil 26, while incorporating a resilient mounting which enables the rotary anvil to move away from the nip in the event an excess load is generated at the nip.

The compositions of substrate webs 16 and/or 17 can be any materials known to those skilled in the art which are compatible with development of ultrasonic bonds. For example, substrate webs 16, 17 can include one or more nonwoven materials such as spunbonded, melt blown, spun laced or carded polymeric materials, a film material such as a polyolefin, for example polyethylenes and/or polypropylenes, or a polyurethane film, a foam material, or combinations of the above recited materials.

For purposes of the present description, "nonwoven web" means a fibrous web of material which is formed of fibers without aid of a textile weaving or knitting process. Substrate webs 16, 17 may be elastic or non-elastic and may comprise films or layers of natural rubber, synthetic rubber or thermoplastic elastomeric polymers.

Typical webs bonded using the invention have thicknesses of about 0.0005 inch to about 0.25 inch at bonding loci, and may have greater or lesser thicknesses at loci of the web which are not being so bonded.

As used herein, the terms "elastomeric" or "elastic" refer to any material which can be elongated or stretched in a specified direction from about 20 percent to at least about 400 percent by application of a biasing force and which recovers to within about 35 percent of its original length after being subsequently released from the biasing force after a short-term duration of the stretched condition.

Substrate webs 16, 17 can be made from a common material or can be made from different materials. In some embodiments, at least one of the substrate webs is made from resiliently stretchable material such as stretch-bonded-laminate (SBL) material, neck-bonded laminate (NBL) material, elastomeric film, elastomeric foam, or like resiliently stretchable materials as are well known to those skilled in the art.

The bonding resulting from application of ultrasonic energy can result from partial or complete melting of materials in one or both of substrate webs 16 or 17, or partial or complete melting of material in a corresponding element being applied to a respective substrate web. Bonding can result from partial or complete melting of material of only one of the elements being acted upon, with the activated material interacting with the corresponding adjacent substrate web or element which in turn results in mechanical interlocking of the elements/webs to each other.

In the alternative, bonding can result in mutual partial or complete melting of materials of both of the elements being acted upon, with flow and/or other interaction between or among the respective materials of both elements which results in a bonding better represented as adhesive bonding or cohesive bonding, optionally in combination with the above-recited mechanical interlocking of components of one or both of the respective elements to each other.

In some embodiments of the invention, portions of continuously moving substrate webs 16, 17 are both softened and/or melted using ultrasonic energy supplied to the rotary ultrasonic horn, along with sufficient pressure to activate the materials in the respective substrate webs, whereby the webs are thus bonded to each other through simultaneous application of ultrasonic energy and pressure. In such a configuration, rotary anvil 26 is configured to rotate about anvil axis 54 and to press substrate webs 16, 17 against outer peripheral bonding surface 45 of ultrasonic horn 24 e.g. at the raised elements thereby intermittently bonding the substrate webs to each other.

In order for the horn and anvil to exert sufficient pressure at bonding nip 22, the horn and/or anvil must move toward each other to close and pressurize the nip. Typically, a force of about 400 pounds per inch width of the nip is sufficient to produce an acceptable ultrasonic bond in nip 22 while preserving the integrity of a typical non-woven web used in fabricating absorbent articles such as diapers. The required nip loading for a given ultrasonic bonding nip operating on a given web, or webs, or web and work piece(s), will be obvious to those skilled in the art.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. Bonding apparatus disposed along a manufacturing line, the manufacturing line defining at least in part an operations path to be traversed by a web to be acted on by said bonding apparatus, the operations path having a length and a width, such web having a length and a width, said bonding apparatus comprising:

(a) support structure supporting said bonding apparatus from an underlying support;

(b) a first nip, defined by, in combination, a first set of bonding elements comprising a first rotary ultrasonic horn and a first rotary anvil, and first engagement apparatus bringing said first rotary ultrasonic horn and said first rotary anvil into effective ultrasonic bonding engagement with each other, the first rotary ultrasonic horn and the first rotary anvil being supported from said support structure and rotating in common with each other thereby to convey such web through the first nip; and (c) a second nip, defined by, in combination, a second set of bonding elements comprising a second rotary ultrasonic horn and a second rotary anvil, and second engagement apparatus bringing said second rotary ultrasonic horn and said second rotary anvil into effective ultrasonic bonding engagement with each other, the second rotary ultrasonic horn and the second rotary anvil being supported from said support structure and rotating in common with each other thereby to convey such web through the second nip, each of said rotary anvils having an outer circumference, and an outer circumferential operating surface at the respective outer circumference, the first and second sets of bonding elements being cooperatively disposed at first and second separate and distinct work stations along the length of the operations path, and being disposed at respective first and second different locations across the width of the operations path, so as to act on such web at respective first and second different locations along the width of such web.

2. Bonding apparatus as in claim 1, said bonding apparatus being arranged, configured, and timed such that both of the first and second sets of bonding apparatus operate on such web at a common location along the length of such web.

3. Bonding apparatus as in claim 1, said bonding apparatus being arranged, configured, and timed such that each of the first and second sets of bonding apparatus operate on such web at a common location along the length of such web thereby to form an uninterrupted pattern of bonding across the width of such web.

4. Bonding apparatus as in claim 3, each said set of bonding elements defining a bonding width capable of forming a bond pattern of corresponding width in such web, said bonding apparatus including a sufficient number of said sets of bonding elements along the operations path that the sum of the bonding widths of the nips defined by said bonding elements is at least as great as the width of the operations path, said bonding apparatus being arranged and configured to operate on a such web having a width no greater than the width of the operations path, said bonding apparatus being further arranged, configured, and timed such that each of said sets of bonding elements operates on such web at a common location along the length of such web, thereby to form an uninterrupted pattern of bonding extending across substantially the entirety of the width of such web.

5. Bonding apparatus as in claim 1, said bonding apparatus further comprising a third nip, defined by, in combination, a third set of bonding elements comprising a third rotary ultrasonic horn and a third rotary anvil, and third engagement apparatus bringing said third rotary ultrasonic horn and said third rotary anvil into effective ultrasonic bonding engagement with each other, the third rotary ultrasonic horn and the third rotary anvil being supported from said support structure and rotating in common with each other thereby to convey such web through the third nip, said first, second, and third sets of bonding elements being arranged at respective first, second, and third separate and distinct locations along the length of the operations path.

6. Bonding apparatus as in claim 1, said apparatus including first apparatus for bringing a second web into surface-to-surface relationship with a first such web, after ultrasonic bonds have been formed in such first web at a respective one of the first and second nips.

7. Bonding apparatus as in claim 6, said apparatus including second apparatus for bringing a third web into surface-to-surface relationship with at least one of such first and second webs, after ultrasonic bonds have been formed in such first web at a respective one of said sets of bonding elements, and after such first and second webs have been ultrasonically bonded to each other at a respective one of said sets of bonding elements.

8. Bonding apparatus as in claim 6, said bonding apparatus being arranged and configured to apply ultrasonic energy, and therefore to create ultrasonic bonds in a such web, by at least one of said sets of bonding elements overlapping corresponding ultrasonic bonds developed by another of said sets of bonding elements, such that at least one of said ultrasonic horns applies ultrasonic energy to a respective such web at a location whereat ultrasonic bonds have been already formed in such web by said bonding apparatus.

9. Bonding apparatus as in claim 1 wherein at least one said rotary anvil has an operating width, at the respective nip, of about 0.6 inch to about 4 inches.

10. Bonding apparatus as in claim 1 wherein at least one said rotary anvil has an operating width, at the respective nip, of about 1 inch to about 3 inches.

11. Bonding apparatus as in claim 1 wherein the respective said rotary anvils have operating widths, at the respective nips, of about 2 inches.

12. Bonding apparatus as in claim 1 wherein ones of said rotary anvils and/or ones of said rotary ultrasonic horns comprise metal selected from the group consisting of aluminum, monel, titanium, and steel, and alloys and mixtures comprising aluminum, monel, titanium and steel.

13. Bonding apparatus as in claim 1 wherein said operating surfaces of said rotary anvils comprise arrays of projections thereon extending around the respective circumferences of said rotary anvils, and across entireties of respective transverse widths of said rotary anvils, thereby covering substantially the entireties of respective operating surfaces of respective said rotary anvils.

14. Bonding apparatus as in claim 1 wherein the operating surface of a respective one of said rotary anvils comprises an array of projections thereon, wherein the array of projections covers a portion but not all of one of the circumference or width of the operating surface of the respective said rotary anvil.

15. Bonding apparatus as in claim 1, each said rotary anvil comprising a first relatively lesser radius base portion extending about a first portion of the circumference of the respective said rotary anvil, and a second relatively greater radius bonding portion extending about a second portion of the circumference of said rotary anvil.

16. Bonding apparatus as in claim 15 wherein the second radius is about 0.01 inch to about 0.07 inch greater than the first radius.

17. Bonding apparatus as in claim 15 comprising a cascading drive wherein timing of said second set of bonding elements, and any subsequent sets of bonding elements are derived from driving of said first set of bonding elements.

18. Apparatus for creating ultrasonic bonds in concurrently advancing webs, thus constructing a composite web having a length and a width, said apparatus comprising:

(a) apparatus for bringing first and second such webs into surface-to-surface relationship with each other, each such web comprising a number of imaginary segments, each segment of each such web having a segment width comprising a separate and distinct portion of the width of such respective web, and extending along substantially the entire length of such respective web, the multiple segments in each such web being substantially parallel to each other;

(b) a number n1 of rotary anvils, each respective rotary anvil having a width substantially equal at least to the width of a respective one of the segments, each respective rotary anvil further having a circumference, and an operating surface defined by an outer circumferential surface, each respective rotary anvil being mounted for rotation about a rotary anvil axis; and (c) a number n2 of rotary ultrasonic horns, each respective ultrasonic horn being mounted about a horn axis, each respective ultrasonic horn being paired with a respective rotary anvil to form a respective bonding nip.

said ultrasonic horns and said rotary anvils collectively being mounted and configured such that said ultrasonic horns and said rotary anvils can be brought together to define the respective nips therebetween, and wherein said rotary anvils and said ultrasonic horns can rotate in common with movement of such web segments through the respective nips, the number of nips being substantially the same as the number of such web segments.

19. A method of creating ultrasonic bonds in a web having a length and a width, the method comprising:

(a) transporting the web through bonding apparatus disposed along a manufacturing line, the manufacturing line defining at least in part an operations path to be traversed by the web, the operations path having a length and a width, the transporting of the web including (i) transporting the web through a first nip, defined by, in combination, a first set of bonding elements comprising a first rotary ultrasonic horn and a first rotary anvil, with the web therebetween, the first rotary ultrasonic horn and the first rotary anvil being supported from support structure, and rotating in common with each other thereby to convey the web through the first nip; and (ii) transporting the web through a second nip, defined by, in combination, a second set of bonding elements comprising a second rotary ultrasonic horn and a second rotary anvil, with the web therebetween, the second rotary ultrasonic horn and the second rotary anvil being supported from the support structure, and rotating in common with each other thereby to convey the web through the second nip, each of the rotary anvils having an outer circumference, and an outer circumferential operating surface at the respective outer circumference, the first and second sets of bonding elements being cooperatively disposed at first and second separate and distinct work stations along the length of the operations path, and being disposed at respective first and second different locations across the width of the operations path, so as to act on the web at respective first and second different locations along the width of the web; and (b) bringing the respective sets of rotary anvils and ultrasonic horns into bonding engagement with each other at respective bonding portions of the respective rotary anvils and ultrasonic horns; and (c) timing application of the bonding engagements so as to apply at least three of the respective sets of bonding elements to the web at a common location along the length of the web.

20. A method as in claim 19, including employing a sufficient number of sets of the bonding elements, arranged across the width of the web, to create bonds across substantially the full width of the web.

21. A method as in claim 19, including drawing the web along the operations path across the respective rotary anvils, and thus through the nips defined between the rotary anvils and respective ones of the ultrasonic horns, at a threading speed of at least about 40 feet per minute.

22. A method as in claim 19, including drawing the web along the operations path across the respective rotary anvils, and thus through the nips defined between the rotary anvils and respective ones of the ultrasonic horns, at a speed of at least about 600 feet per minute.

23. A method as in claim 19, including drawing the web along the operations path across the respective rotary anvils, and thus through the nips defined between the rotary anvils and respective ones of the ultrasonic horns, at a speed of at least about 1000 feet per minute.

24. A method as in claim 19 including mechanically loading each set of bonding elements at up to about 400 pounds of pressure per inch linear width across an energy-applying portion of the nip as defined by the respective rotary anvil and corresponding ultrasonic horn.

25. A method as in claim 19, the rotary anvils each having a pattern of raised elements on the respective circumferential surface, each respective set of bonding elements developing bonds in the web in accord with the raised elements.

26. A method as in claim 19, the web comprising a first web, and including drawing a second web, having a length and a width, into surface-to-surface engagement with the first web at at least one of the respective first and second nips, and employing the respective set of bonding elements at the respective nip to bond the second web to the first web, thereby to define a combination web.

27. A method as in claim 26, including disposing the second web in surface-to surface engagement with the first web at each of the respective nips, and employing the respective sets of bonding elements at the respective nips to bond the first and second webs to each other.

28. A method as in claim 27, including employing sufficient number of sets of bonding elements, arrayed across the widths of the first and second webs, to bond the second web to the first web across the entirety of a width defined by the surface-to-surface engagement of the first and second webs with respect to each other.

29. A method as in claim 26, including drawing a third web, having a length and a width, into surface-to-surface engagement with at least one of the first and second webs after the ultrasonic bonding of the first and second webs to each other, and applying ultrasonic energy to the third web at a third location downstream from the first and second sets of bonding elements, thereby bonding the third web to the combination web.

30. A method as in claim 19, ultrasonic bonding effected by at least one of the sets of bonding elements overlapping, along the width of the web, with ultrasonic bonding effected by at least one other of the sets of bonding elements, such that at least one rotary ultrasonic horn applies ultrasonic energy to previously ultrasonically bonded portions of the web.

31. A method of fabricating a composite web having a length and a width wherein first and second webs are bonded to each other over substantially the entirety of a common width, the method comprising:
 (a) drawing the first and second webs into surface-to-surface relationship with respect to each other over a common width, and thereby defining a web combination;
 (b) passing the web combination through first and second nips spaced at first and second locations along a length of a manufacturing line, each nip being defined by, in combination, a set of bonding elements comprising a rotary ultrasonic horn and a rotary anvil;
 (c) bringing each respective set of bonding elements together in defining the respective nips, and correspondingly developing suitable pressure in the nips to create ultrasonic bonds;
 (d) activating ultrasonic energy in the respective rotary ultrasonic horns; and
 (e) rotating the respective ultrasonic horns and rotary anvils in common with movement of the web combination through the respective nips, thereby applying pressure to the web combination, and correspondingly creating ultrasonic bonds in the web combination as the web combination passes through the nips, and thereby transforming the web combination into a combination web.

32. A method as in claim 31, including intermittently applying pressure to the web combination through the respective nips and correspondingly creating longitudinally-spaced intermittent bonds in the web combination at the respective nips, and wherein the bonds created by successive such nips are positioned in registration with respect to each other across the width of the combination web.

33. A method as in claim 31, including arranging the respective sets of bonding elements across the width of the web combination at respective longitudinally spaced locations with combined effective bonding widths of the respective nips effecting bonding at substantially all locations across the width of the web combination, such that the entireties of the common widths of the first and second webs are bonded to each other across the entirety of the common width of the combination web.

34. A method as in claim 31, including arranging the respective sets of bonding elements across the width of the web combination at respective longitudinally spaced locations with combined effective bonding widths of the respective nips effecting bonding at substantially all locations across the width of the combination web, such that the entireties of the common widths of the first and second webs are bonded to each other across the entirety of the common width of the web combination, along substantially the entire length of that portion of the combination web which has passed through the respective nips.

35. A method as in claim 31, including arranging the respective sets of bonding elements across the width of the web combination at respective longitudinally spaced locations with combined effective bonding widths of the respective nips effecting bonding at substantially all locations across the width of the web combination, such that the entireties of the common widths of the first and second webs are bonded to each other across the entirety of the common width of the web combination, at longitudinally-spaced locations along the length of the web combination.

36. A method as in claim 31, including developing bonds along the entirety of the width of the web combination, including width segments projected from only one of the two webs.

37. A method as in claim 31, including disposing a third web onto the combination web after the ultrasonic bonding of the first and second webs to each other at the first and second locations, ones of the sets of bonding elements applying bonding levels of ultrasonic energy to at least one of the combination web and the third web at locations where the third web overlies the combination web, thereby bonding the third web to the combination web.

38. A method as in claim 31, comprising deriving timing of the second set of bonding elements, and any subsequent sets of bonding elements from driving of the first set of bonding elements.

39. A method as in claim 31, the rotary anvils comprising first relatively lesser radius portions extending about respective first portions of circumferences of said rotary anvils, and second relatively greater radius bonding portions extending about second portions of the circumferences of said rotary anvils.

40. A method as in claim 31, the first web having a greater width than the second web, including bonding the full width of the second web to the first web.

* * * * *